US011666177B2

(12) United States Patent
Berents et al.

(10) Patent No.: US 11,666,177 B2
(45) Date of Patent: Jun. 6, 2023

(54) ROTISSERIE OVEN, METHOD CARRIED OUT BY A CONTROL SYSTEM OF A ROTISSERIE OVEN, AND COMPUTER PROGRAM (71) Applicant: Fri-Jado B.V., Oud Gastel (NL)

(72) Inventors: Robert Evert Willem Berents, Berkel-Enschot (NL); Patricius Aloys Petrus Anna Van Boven, Wernhout (NL)

(73) Assignee: FRI-JADO B.V., Oud Gastel (NL)

( * ) Notice: Subject to any disclaimer, the term of this patent is extended or adjusted under 35 U.S.C. 154(b) by 199 days.

(21) Appl. No.: 17/299,125

(22) PCT Filed: Dec. 11, 2019

(86) PCT No.: PCT/NL2019/050827
§ 371 (c)(1),
(2) Date: Jun. 2, 2021

(87) PCT Pub. No.: WO2020/122720
PCT Pub. Date: Jun. 18, 2020

(65) Prior Publication Data
US 2022/0007886 A1    Jan. 13, 2022

(30) Foreign Application Priority Data
Dec. 12, 2018   (NL) .................................... 2022189

(51) Int. Cl.
A47J 37/04    (2006.01)
F24C 7/08     (2006.01)
F24C 15/16    (2006.01)

(52) U.S. Cl.
CPC ............... *A47J 37/04* (2013.01); *F24C 7/085* (2013.01); *F24C 15/164* (2013.01)

(58) Field of Classification Search
CPC .......... A47J 37/04; F24C 15/164; F24C 7/085
USPC .......................................................... 99/419
See application file for complete search history.

(56) References Cited

U.S. PATENT DOCUMENTS

| 5,639,497 A * | 6/1997 | Bedford ................. A47J 37/042 |
| | | 426/523 |
| 8,931,400 B1 | 1/2015 | Allen |
| 11,191,132 B2 * | 11/2021 | Lee .......................... F24C 7/086 |
| 2002/0023547 A1 | 2/2002 | Backus |
| 2014/0201628 A1 | 7/2014 | Guilleminot |

(Continued)

FOREIGN PATENT DOCUMENTS

| CH | 700524 A1 | 8/2010 |
| DE | 202012005255.1 U1 | 8/2012 |

(Continued)

*Primary Examiner* — Dana Ross
*Assistant Examiner* — James F Sims, III
(74) *Attorney, Agent, or Firm* — Rogowski Law LLC (57) ABSTRACT A rotisserie oven for a food product, such as poultry, has a casing defining an oven cavity, and has a rotor, rotatably connected to the casing, with a drive for driving the rotor, and a heater for heating the food product, and a control system for controlling the drive. The control system has a control unit, a touchscreen, and a contactless motion sensor which is configured to recognize a motion of an object or of an operator's body part in front of the contactless motion sensor. The control system is programmed to initiate an action based on the recognized motion.

14 Claims, 5 Drawing Sheets (56) References Cited

U.S. PATENT DOCUMENTS

2017/0199658 A1 7/2017 Stoufer
2018/0224150 A1 8/2018 Lewis

FOREIGN PATENT DOCUMENTS

WO 2013053395 A1 4/2013
WO 2018044171 A2 3/2018

* cited by examiner

ROTISSERIE OVEN, METHOD CARRIED OUT BY A CONTROL SYSTEM OF A ROTISSERIE OVEN, AND COMPUTER PROGRAM

BACKGROUND OF THE INVENTION

Technical Field and State of the Art

A rotisserie oven is used to prepare food, such as poultry, for example chickens, in stores, bars and restaurants. Usually, the rotisserie oven is provided with a glass door, so that potential buyers can view the cooking process of the food in an oven cavity.

A rotisserie oven is known from WO-2018/044171. The known rotisserie oven comprises a casing with an oven cavity, and a heater for heating the food product. The heater comprises two heating elements, e.g., electrical heating spirals or plates, and a ventilator. A guiding structure is provided in order to direct a hot air stream to the food product. The rotisserie oven further comprises two rotors, rotatably connected to the casing, for moving the food product in the oven cavity. The rotors are provided opposite of each other and a joint axis connects both rotors. An electrical drive drives the rotor. The rotisserie oven comprises several exchangeable food supports which are connectable to the rotary for supporting the food product. An example of a food support is a spit, preferably used to hold a chicken. Another example is a basket for holding other type of food products. The rotisserie further comprises a control system with a user interface. The user interface is not shown or described in detail. However, common user interfaces include a screen and physical controls, such as buttons.

A disadvantage of the known rotisserie oven is that its operation offers hygienic risks. A food product, such as poultry, is loaded into the oven cavity in batches, using exchangeable food supports. A common example is chickens on a spit. Multiple spits with chickens need to be attached to the rotor by an operator. After each spit, the rotor needs to be rotated so that a new attachment point for the next spit can be reached by the operator. After loading all spits, a cooking program of the rotisserie oven is started. The same procedure is followed for other types of food supports. The hands of the operator come into contact with the food product while handling the food supports. In the best case, this is just grease. In the worst case, this comprises bacteria such as campylobacter and salmonella. By operating the physical controls of the rotisserie oven, the operator contaminates these controls. This contamination can later be transferred to other users and/or to the cooked product when it is removed from the rotisserie oven. Food contaminated with bacteria such as campylobacter and salmonella causes many illnesses, which may even result in the death of more vulnerable people such as young and elderly people, and pregnant women.

The invention aims to solve at least one of these problems, or at least to provide an alternative. In particular, the invention aims to provide a rotisserie oven which is more safe in use from a hygienic point of view.

SUMMARY OF THE INVENTION

A rotisserie oven comprises a casing, an oven cavity within the casing for a food product, such as poultry, a rotor, rotatably connected to the casing, for moving the food product in the oven cavity, a drive for driving the rotor, a heater for heating the food product, and a control system for controlling at least the drive. The control system further comprises a contactless motion sensor which is configured to recognize/recognise a motion of an object in front of the contactless motion sensor. The control system is configured to initiate an action based on the recognized/recognised motion.

The contactless motion sensor of the inventive rotisserie oven makes it unnecessary to contact physical controls, such as buttons or a touchscreen, of the rotisserie oven during and/or right after loading the oven with the uncooked food product. Therefore, the risk of bacterial contamination is reduced.

In an embodiment, the control system is configured to activate the drive to rotate the rotor in response to a predetermined motion in front of the contactless motion sensor. In particular, the control system is configured to activate the drive to rotate the rotor over a predetermined amount of degrees. This enables loading of the rotisserie oven with a plurality of food supports without touching the oven during this process.

In particular, the predetermined number of degrees equals to 360° divided by the number of connection points for food supports per rotor. In particular, the predetermined number of degrees is stored in the control system. More in particular, the predetermined number of degrees is stored in the control system as function of the type of rotor which is present in the oven cavity.

In particular, the predetermined motion in front of the contactless motion sensor is a motion parallel to the contactless motion sensor, in particular a vertical motion. Such a motion can easily be performed by an operator, e.g. with his elbow, even when he holds a food support in both his hands.

In an embodiment, the control system is configured to start a cooking program in response to a predetermined motion in front of the contactless motion sensor. In this way, the operator can immediately start the rotisserie oven after loading the food supports into the oven cavity, without the need to clean his hands first. Such a cooking program comprises rotating the drive of the rotor(s) with food support(s) and applying of heat to the food by the heater.

In particular, the predetermined motion in front of the contactless motion sensor is a motion towards and/or from the contactless motion sensor. This motion is easily applied with a hand. Moreover, it is easy discernible from the motion parallel to the contactless motion sensor, and is an easy motion to remember and apply.

In an embodiment, the control system further comprises a display. This display is suitable to provide the operator with information before, during, and after the loading of the rotisserie oven, as well as during the cooking process.

In particular the display is a touchscreen. This is a user-friendly user interface for inputting information which is not entered by motions in front of the contactless motion sensor, such as selecting a specific cooking program which can be performed before the operator starts handling the food supports.

In particular, the control system is configured to bring the display in an active mode in response to a predetermined motion in front of the contactless motion sensor. This enables the display to be switched off, or at least go into a low energy modus, in a default state. When an operator makes the predetermined motion, the display becomes active and displays the actual status during the cooking process, a menu for selecting a cooking program when the rotisserie oven is not cooking food at that moment, or any other useful information.

More in particular, the predetermined motion in front of the contactless motion sensor is a motion towards the contactless motion sensor. This corresponds to an operator approaching the rotisserie oven, so no extra gesture needs to be applied to make the display active.

In an embodiment, the contactless motion sensor is one of the following types: infrared sensor, or electric field proximity sensor. These types of sensor provide sufficient reliability for an affordable price.

In an embodiment, the contactless motion sensor is positioned at a height above a floor on which the rotisserie oven is placed which is chosen from a range of 1.0 meter to 1.5 meter, in particular 1.2 to 1.4 meter. This enables the operator in a standing position to use his elbow to make the required motions in front of the contactless motion sensor.

In an embodiment, the contactless motion sensor is provided at an outside surface of the casing. Preferably, the contactless motion sensor is provided with a cover, which cover preferably is flush with the outside surface of the casing, more preferably is integrated with the outside surface of the casing.

The invention further relates to a method that provides the same or similar effects and advantages as described above in relation to the rotisserie oven.

In an embodiment, the list of method steps at least comprises controlling a drive of a rotor of the rotisserie to rotate, and the action is initiated by supplying power to a drive of a rotor of the rotisserie oven. This enables starting the drive without touching the rotisserie oven. In particular, the rotor is driven over a predetermined number of degrees. By rotating the drive of the rotor over a predetermined number of degrees, an operator is able to connect a subsequent food support to the rotor. In particular, the predetermined number of degrees equals to 360° divided by the number of connection points for food supports per rotor. In particular, the predetermined number of degrees is stored in the control system. More in particular, the predetermined number of degrees is stored in the control system as a function of the type of rotor which is present in the oven cavity.

In an embodiment, the list of method steps further comprises: starting a cooking program, and/or activating a display. Such further actions decrease the number of operations wherein an operator needs to touch the physical controls of the rotisserie oven and thus reduces the risk of contamination.

In an embodiment, the steps of detecting a motion and/or analysing a motion and/or the step of selecting an action, based on the analysis of the detected motion, is/are not performed when an action initiated by a motion is not expected. Specific commands should be given at specific moments, when the rotisserie oven and its control system are ready to perform the related action. As an example, rotating the drive over a predetermined number of degrees is only expected after a cooking program has been selected and an oven door has been opened. By only accepting commands by motions at moments when the action is expected, the control system avoids unwanted actions by the rotisserie oven by unconscious motions in front of the contactless motion sensor.

In an embodiment, the step of analysing the detected motion comprises determining whether the analysed motion is one of the list: a vertical motion, a horizontal motion parallel to the rotisserie oven, a motion towards the rotisserie oven, and a motion from the rotisserie oven. These are motions which are relatively simple to apply by an operator, and are relatively easy to interpret by the control system.

The invention further relates to a computer program, e.g., a nontransitory computer readable medium containing executable instructions, which, when the program is executed by a control system of a rotisserie oven, cause the control system to carry out the steps of the method according to the invention as described above.

DESCRIPTION OF THE DRAWINGS

The invention, its effects, and advantages will be explained in more detail on the basis of the schematic drawing, in which.

DETAILED DESCRIPTION

Figure 1:
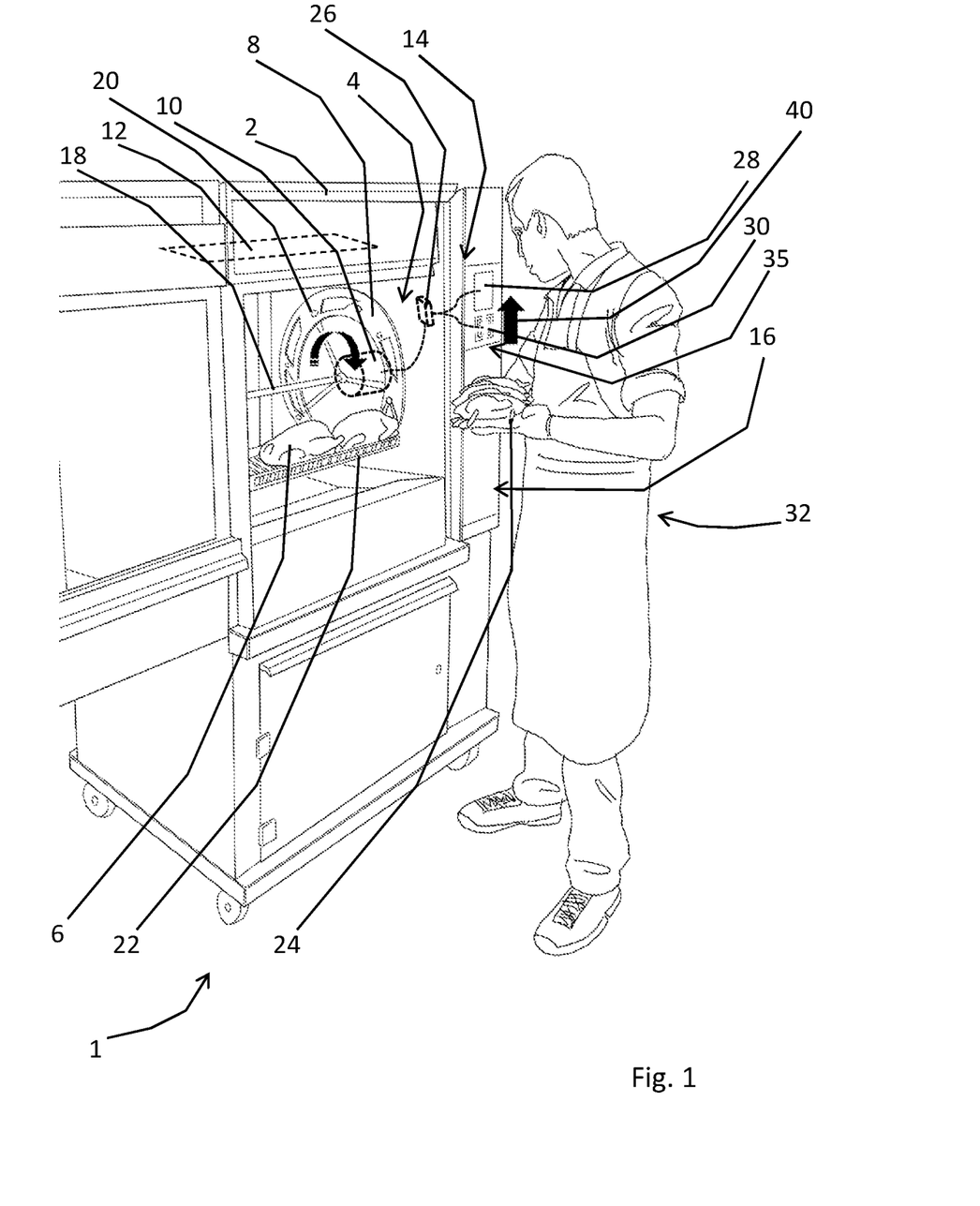
FIG. 1 shows a perspective view of a rotisserie oven according to the invention with an operator.
Figure 2:
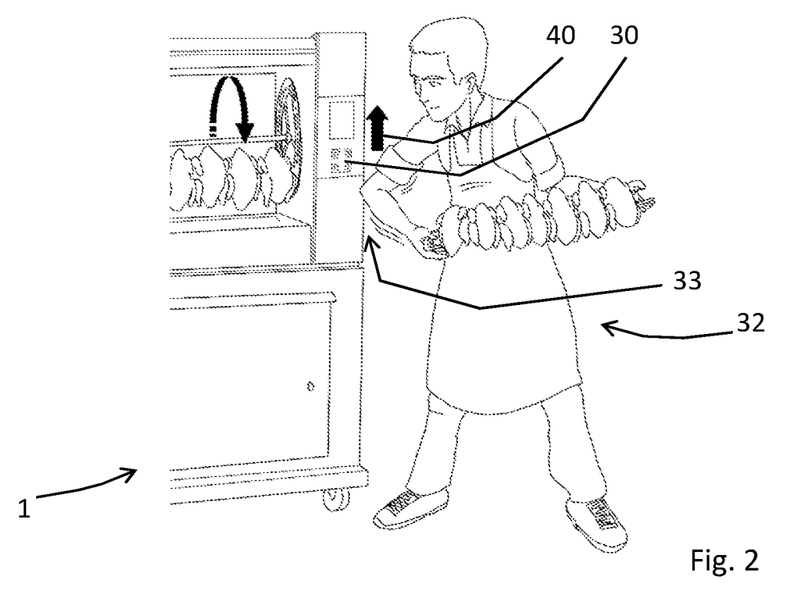
FIG. 2 shows the rotisserie oven of FIG. 1 with the operator in another position.
Figure 3:
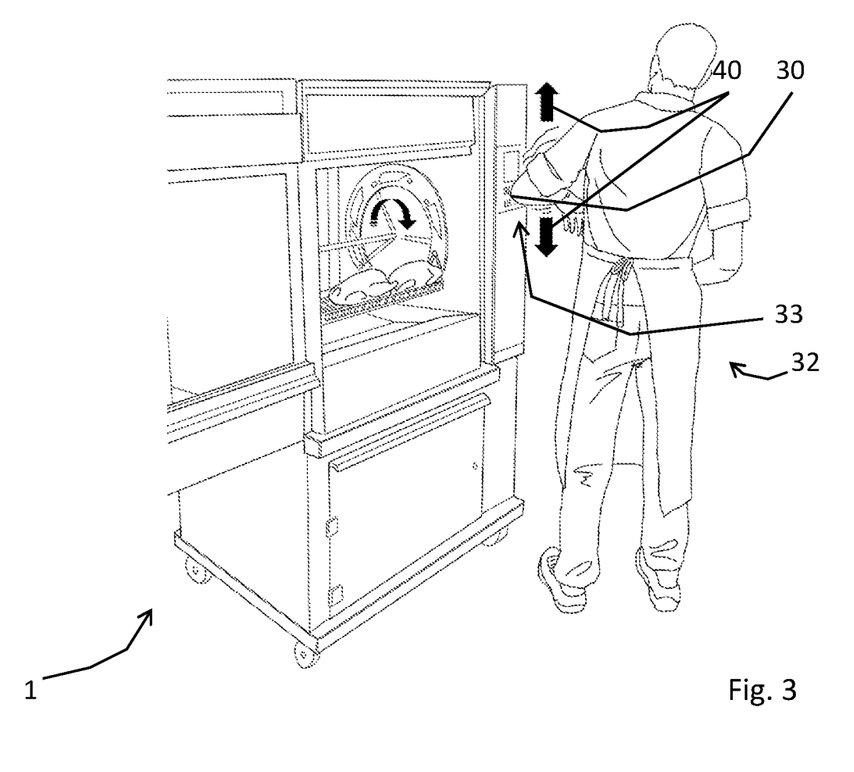
FIG. 3 shows the rotisserie oven of FIG. 1 with the operator in yet another position.

FIGS. 1-3 show a rotisserie oven according to the invention, which is denoted in its entirety by reference number 1. The rotisserie oven 1 comprises a casing 2, an oven cavity 4 within the casing 2 for a food product, such as poultry 6, a rotor 8, rotatably connected to the casing 2, for moving the food product in the oven cavity, a drive 10 for driving the rotor, a heater 12 for heating the food product, and a control system 14 for controlling the drive, and in this embodiment also for controlling the heater 12. The oven cavity 4 is closable by a door (not shown). The shown embodiment comprises one door at a front side 16 of the rotisserie oven 1. The drive 10 and the heater 12 are shown by means of dotted lines, because the respective parts would not be visible in the view of FIGS. 1-3 as they are behind casing 2. The heater 12 is shown schematically only, and comprises two heating elements, e.g., electrical heating spirals or plates, and a ventilator. A guiding structure is provided in order to direct a hot air stream to the food product.

The rotor 8 of this embodiment is positioned opposite of a second rotor (not visible in the figures), which is also rotatably connected to the casing 2, and connected to the second rotor via a spindle 18. The rotors of this embodiment each comprise eight connection points, in this case holes 20, for connecting food supports, such as a meat basket 22, meat fork 24, bob rack, and/or a V-spit (not shown).

The control system 14 comprises a control unit or computer 26 (shown in dotted lines, as it is within the casing 2), a touchscreen 28, and a contactless motion sensor 30 which is configured to recognize/recognise a motion of an object in front of the contactless motion sensor 30. The control system 14, in this case the control unit 26, is programmed to initiate an action based on the recognised motion. In this embodiment, the control unit 26 is programmed to activate the drive 10 to rotate the rotor 8 over 45° in response to a vertical motion parallel to and in front of the contactless motion sensor 30, as shown in FIGS. 1-4. This enables an operator 32 to load the rotisserie oven 1 with a plurality of food supports without touching the oven during this process, as he can even use his elbow 33 when his hands are full to make the vertical motion.

The number of degrees of rotation depends on the type and size of the rotisserie oven 1, as well as the relevant rotor 8. A memory (not shown) of the control unit 26 stores the number of degrees of rotation in dependence of the specific rotor 8 and its number of connection points. In general, the number of degrees of rotation equals to 360° divided by the number of connection points for food supports per rotor 8. The operator can override the stored setting for the predetermined number of degrees of rotation by means of the touchscreen 28 before loading the rotisserie oven 1, e.g., in case he knows that the actual number of food supports is less than the number of available connection points 20.

Figure 5:
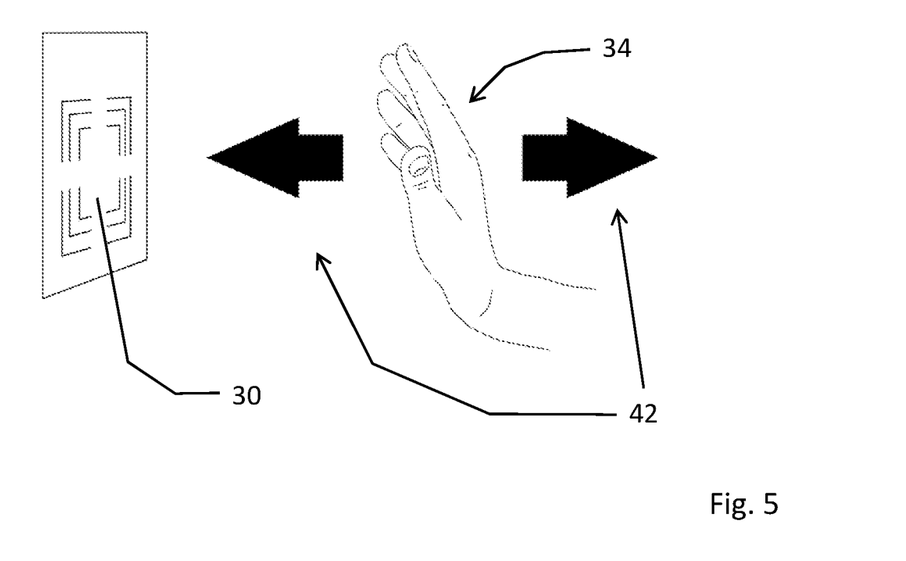
FIG. 5 shows the same detail as FIG. 4, but with another movement by the operator.

In the shown embodiment, the control unit 26 is further programmed to start a cooking program in response to a motion towards and from the contactless motion sensor 30, as shown in FIG. 5. This motion is easily performed with a hand 34. In this way, the operator 32 can immediately start the rotisserie oven 1 after loading the food supports into the oven cavity 4, without the necessity to clean his hands first, or the risk of contaminating the outside of the rotisserie oven 1.

In the shown embodiment, the control unit 26 is also programmed to bring the touchscreen 28 in an active mode in response to a motion towards the contactless motion sensor 30. This enables the display to be switched off, or at least to go into a low energy modus, in a default state. When an operator 32 approaches the rotisserie oven 1, the display of the touchscreen 28 becomes active. It displays the actual status before, during, and after the cooking process, a menu for selecting a cooking program when the rotisserie oven 1 is not cooking food at that moment, or any other useful information. Touching the touchscreen 28 enables the operator to input information which is not entered by motions in front of the contactless motion sensor 30. An example is selecting a specific cooking program which is done before the operator 32 starts handling the food supports.

In the shown embodiment, the contactless motion sensor 30 is an electric field proximity sensor. The contactless motion sensor 30 is positioned at approximately 1.3 meter above a floor on which the rotisserie oven 1 is placed. The contactless motion sensor 30 is provided at an outside surface 35 of the casing 2, and is provided with a cover, which is integrated with the outside surface 35 of the casing 2.

FIG. 1 shows the operator 32 holding the meat fork 24 with chickens with two hands. One product support, i.e., the meat basket 22, is already present in the rotisserie oven 1 and attached to the holes 20 of the rotors. The operator 32 moves his elbow vertically in front of the contactless motion sensor 30, as shown indicatively by arrow 40.

FIG. 2 also shows the operator 32 holding the meat fork 24, but with an earlier positioned spit in the rotisserie oven 1 and standing in another position. The operator 32 moves his elbow in front of the contactless motion sensor 30, with the vertical movement (double arrow 40) for rotating the rotors over a predetermined amount of degrees.

FIG. 3 shows the unloading of grilled products. The operator 32 has taken out all but one of the food supports, and has moved his elbow vertically in front of the contactless motion sensor 30 (double arrow 40) so that the last meat basket 22 rotates to a position where the operator 32 can easily take it out from the rotisserie oven 1.

Figure 4:
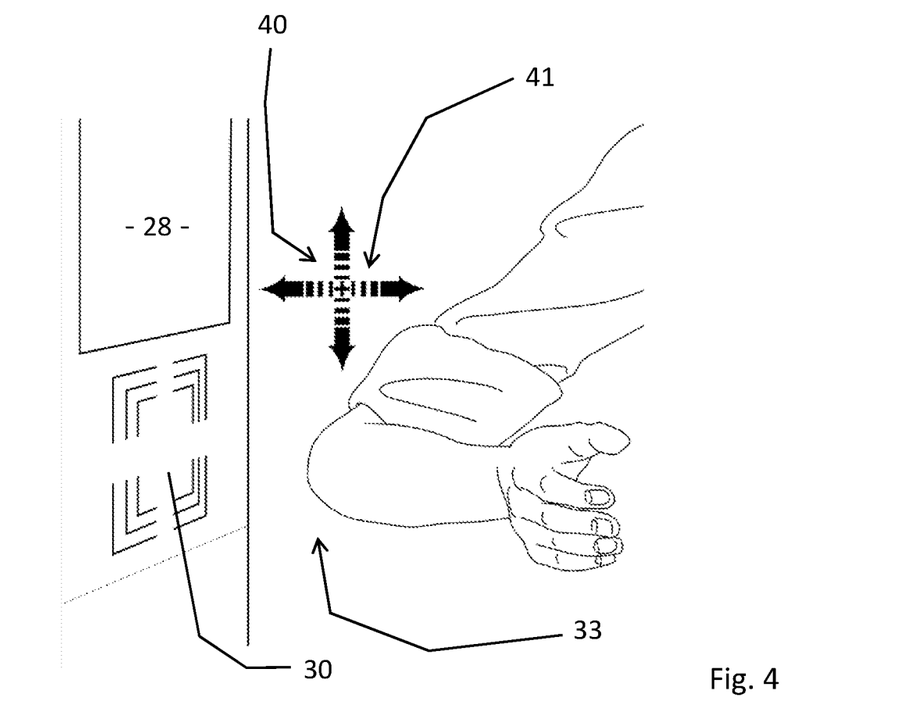
FIG. 4 shows a detail of the rotisserie oven of FIG. 1.

FIG. 4 shows in detail possible motions of the elbow in front of, and parallel to, the contactless motion sensor 30, with the vertical movement (double arrow 40) for rotating the rotors over a predetermined amount of degrees, and a horizontal movement (double arrow 41) which has not been assigned a task in the current embodiment, and can be used instead of one of the other motions or for another command. FIG. 5 shows he is starting and/or interrupting of the cooking process by moving a hand 34 to and from the contactless motion sensor 30 (double arrow 42).

Figure 6:
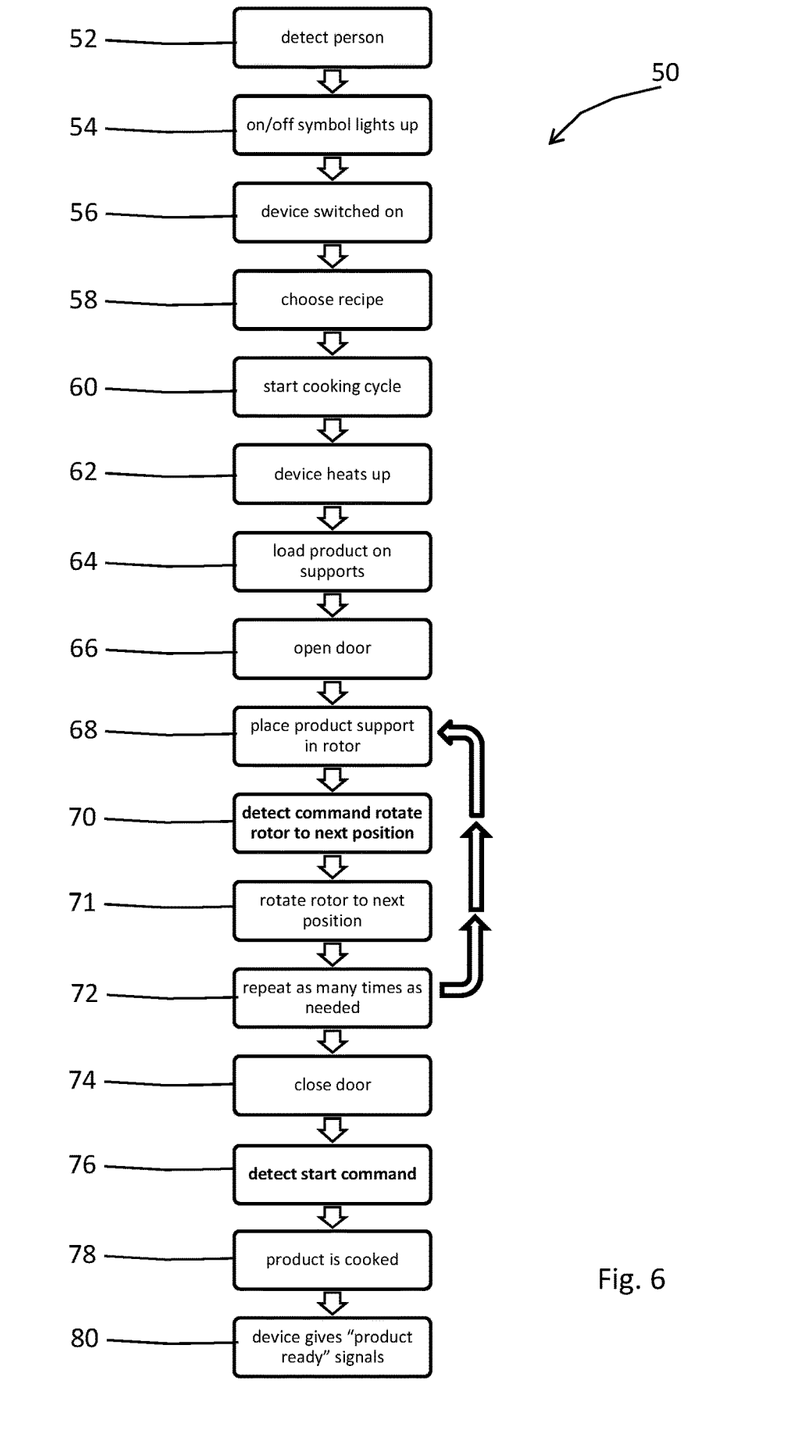
FIG. 6 shows a flow diagram with method steps for loading and starting the rotisserie oven according to the invention.
Figure 7:
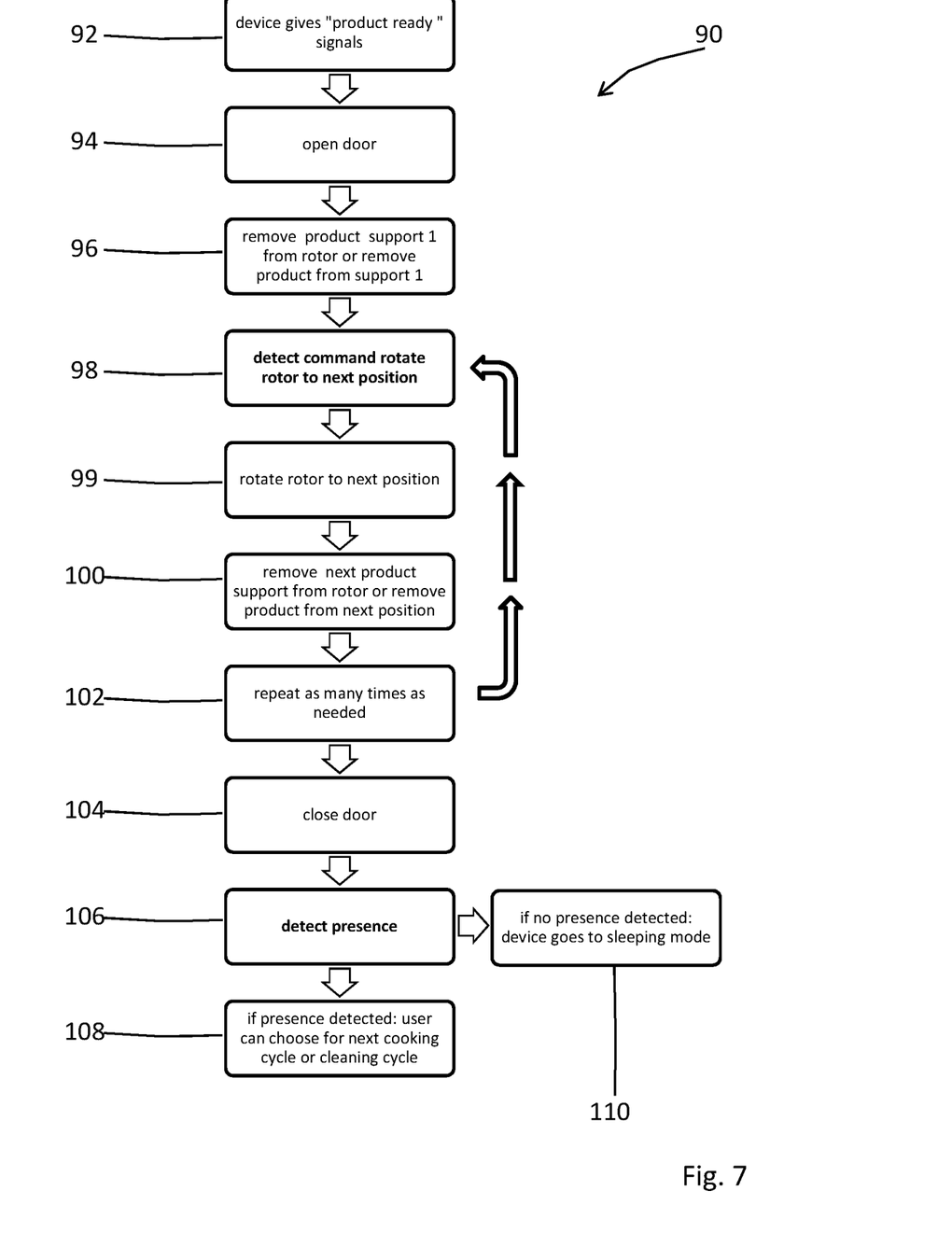
FIG. 7 shows a flow diagram with method steps for unloading the rotisserie oven according to the invention.

A method for performing the invention is shown in FIGS. 6 and 7. Such a method may be performed using a rotisserie oven 1 as shown in FIGS. 1-5, or with a similar rotisserie oven. The method steps which are not performed by the operator are programmed in a control system of the rotisserie oven. In one embodiment, the relevant control system comprises a generic control unit or computer which is loaded with software embodying the inventive method. In another embodiment, the control system comprises dedicated hardware, with the method steps programmed e.g. in the ROM. Steps performed by giving a motion command are shown in bold font in the figures. In the following, a step of detecting a motion comprises the actual observing of the motion, analyzing/analysing the motion, and determining whether the analyzed/analysed motion is a motion type from a list of known motion types.

A first embodiment of the inventive method relates to a method 50 for loading of the rotisserie oven, as schematically shown in FIG. 7. The rotisserie oven and its controls are in a rest, or sleeping mode when not in use. A contactless motion sensor is active though and detects in step 52 a person approaching the rotisserie oven. As a result, the on/off symbol lights on (step 54). The control system of the rotisserie oven is switched on, i.e. wakes up from the sleeping mode, by using a physical switch, button, or touchscreen, at step 56. In an alternative embodiment, the control system is switched on by a predetermined motion in front of the contactless motion sensor.

The operator chooses a cooking program, or recipe, at step 58. A display of the rotisserie displays several options, e.g., ordered in menus, from which the operator can choose. An example of an option is a predetermined cooking program. Another option is the manual input of temperature, cooking time, and/or rotation speed. The cooking cycle is started at 60, e.g. by confirming the choice of the recipe. The rotisserie oven heats up at step 62.

During or after the heating up of the rotisserie oven, the operator loads products, such as poultry, or other meat or non-meat products on food supports at step 64. When the rotisserie oven is pre-heated and the food products are loaded on supports, the operator opens the door at 66. The operator takes the first product support and places it in the oven cavity between the rotors (step 68).

The operator gives a command with his elbow, e.g., by moving it vertically in front of the contactless motion sensor. The control system detects this command at step 70, and provides power to a drive 10 to rotate the rotor at step 71. Steps 68, 70, and 71 are repeated at step 72, until the operator closes the door at step 74. The operator gives a start command, e.g. by moving his hand 34 to and from the contactless motion sensor. At step 76, this motion is detected by the control system, starting the cooking cycle (step 78). When the cooking program is finished, the display and/or an audible alarm gives product ready signals at step 80.

A second embodiment of the inventive method relates to a method 90 for unloading the rotisserie oven, as schematically shown in FIG. 8. The device is in a state wherein it gives signals that the product(s) is/are ready at step 92. It is noted that in a preferred embodiment, both the first embodiment and the second embodiment of the inventive method are both performed subsequently, but each in itself embodies the invention and is protected by the attached claims. Thus step 92 is preferably the same as step 80 of the first embodiment. The operator opens the door at step 94, and removes the first product support from the rotor(s), or just the product(s) from the first product support at step 96. The operator gives a command to rotate the rotor to the next position, e.g. by moving his elbow vertically in front of the contactless motion sensor.

The control system detects this command at step 98, and provides power to a drive to rotate the rotor at step 99. The operator removes the next product support from the rotor(s), or just the product(s) from the next product support at step 100. Steps 98, 99, and 100 are repeated at step 102, until the operator closes the door at step 104.

The control systems monitors at step 106 whether the operator is near. If this is the case, the control system remains in the active mode (step 108) so that the operator can choose for a next cooking cycle, or for a cleaning cycle (not disclosed in detail). When the control system does not detect the presence of an operator at step 106 anymore, it goes into sleeping mode at step 110, i.e., the display goes off and/or the control system goes into a mode of low energy consumption, wherein at least the contactless motion sensor remains active. Preferably, a time lag is programmed between the detecting of the absence of the operator and the going into sleep mode.

In an embodiment of either or both inventive methods, the steps of detecting a motion and/or analysing a motion and/or the step of selecting an action, based on the analysis of the detected motion, is/are not performed when an input by a motion is not expected. Preferably, the step 70 or the step 98 of detecting the command to rotate the rotor can be performed only after the door has been opened at step 66, or 94 respectively. Preferably, the detecting of the start command at step 76 can be performed only after step 74 of closing the door has been performed.

Several variants are possible within the scope of the attached claims. The features of the above-described preferred embodiment(s) may be replaced by any other feature within the scope of the attached claims, such as the features described in the following paragraphs.

Alternative embodiments comprise one or more of the following contactless motion sensors: infra-red motion sensor, electric field proximity sensor, depth-aware cameras, such as structured light and time-of-flight cameras, stereo cameras, radar. It is to be noted that a suitable sensor not only notices a motion in general, but is also able to generate a signal which is indicative of the direction of the motion. This requirement distinguishes the suitable infra-red sensors over commonly known infra-red sensors which merely detect a presence. In an embodiment, a suitable infra-red sensor module comprises infrared LEDs positioned in a certain pattern which projects light on an operator which enables the actual infra-red sensor to detect a direction of a motion of a body part of the operator. Both infrared sensors and electric field proximity sensor require some local intelligence which results in a relative simple output which can be processed by a computing unit with a relative limited computing force. This makes these types of sensors relatively simple, while the range of detected motions suffices for the above-described preferred embodiments. Sensors such as radar and depth-aware cameras require more computing force and are able to distinguish between more different motion types.

An embodiment of a contactless motion sensor comprises two infrared emitters, preferably infrared light emitting diodes (IR LEDs) and one infrared sensor. Preferably, the IR LEDs and IR sensor are jointly mounted on one printed circuit board (pcb). Both IR LEDs are controllable independently of each other in time and intensity. The detection of gestures is accomplished by comparing the signal of infrared light originating from each of the IR LEDs. The emitted IR light is reflected by an object, such as a hand, or an elbow. The reflected IR light is detected by the proximity sensor. In order to differentiate between the signals coming from either IR LED, the LEDs are multiplexed, meaning they are pulsed one after the other in quick succession. When a hand or elbow is in the proximity range of the PCB, it will reflect more signal from the LED it is closer to than from the other LED. If the hand or elbow is then moved across the IR LEDs, the signal which is reflected from one emitter will increase with respect to the other. It is this time difference of signal strength that is analyzed to determine if a swipe gesture was made and in which direction. The same LEDS and sensor are used to detect a proximity of an object, such as an operator of the rotisserie oven. This is accomplished by measuring the amplitude of the reflected IR light, while one or both LEDs pulse at the same time with an intensity which is higher than while detecting a gesture.

In preferred embodiments, the contactless motion sensor detects motions within a range of 5-30 cm from the front of the sensor. A mere presence detection, i.e. detection of a motion without being able to analyse the direction of the motion, is preferably possible within a distance of 1 m from the front of the sensor.

In an embodiment, a contactless motion module comprises hard- and software for not only detecting but also analysing the relevant motion. In an alternative embodiment, the analysing of the motion is done in another part of the control system, e.g., a central computing unit.

While using a hand and elbow for giving commands are preferred, the invention is not limited to the use of these body parts. A head movement is one of the alternative motions which could be used within the scope of the invention. The height for positioning the contactless motion sensor is chosen in accordance with the body part which is intended for giving the commands and preferably also the average body height of the operators in the area where the rotisserie oven is to be used.

In a simple embodiment, the list of possible actions from which an action is selected consists of one action, in particular the action of starting the rotor. In general, the list comprises at least one action, i.e., one or more actions.

In an embodiment wherein the rotisserie oven is configured to be loaded by a standing operator, the height of the contactless motion sensor above a floor level is preferably between 1.2 meter and 1.4 meter. In an embodiment wherein the rotisserie oven is configured to be loaded by a kneeling operator, e.g., in a configuration with two devices on top of each other wherein the rotisserie oven is the lower device, the height of the contactless motion sensor above a floor level is preferably between 0.5 meter and 0.8 meter, in particular 0.7 meter.

An embodiment comprises physical controls, such as buttons instead of or in addition to a touchscreen.

An embodiment comprises a second door at a backside. Such an embodiment comprises preferably a second contactless motion sensor and/or a display and/or a touchscreen and/or physical controls at the backside too. Such an embodiment enables loading of raw food at one side and unloading the cooked food at another side, thus further reducing the risk of bacterial contamination.

Food supports that are useable in a rotisserie oven according to the invention include meat baskets, V-spits, meat forks, and bob racks. An alternative embodiment of the rotisserie oven comprises one rotor only. A drive suitable for driving the rotor is an electric motor. Alternative drives include hydraulic motors.

It is concluded that the inventive rotisserie oven, and related method and computer program, offer an improved user interface wherein contamination and thus the health risk related to bacterial infections, are reduced. Such advantages are not achievable by using a touchscreen only, as this would get contaminated during use, in particular during the loading and/or unloading of food products. Such contamination would not only cause said health risks, but could also hinder the proper working of the touchscreen. It also offers advantageous over voice control, as such control is not reliable in a noisy environment caused by talking customers and by extractor hoods, and which is also difficult to implement if operators use different languages. The invention offers also advantages over a solution with a foot operated pedal, as such a pedal would also get contaminated by grease dripping from the food products on the floor.

The invention claimed is:

1. A rotisserie oven, comprising:
a casing,
an oven cavity within the casing for a food product,
a rotor, rotatably connected to the casing, for moving the food product in the oven cavity,
a drive for driving the rotor,
a heater for heating the food product, a control system for controlling at least the drive, the control system comprising a contactless motion sensor,
wherein the control system is configured to recognize a motion of an object or an operator's body part in front of the contactless motion sensor, and to initiate an action based on the recognized motion, and wherein the control system is configured to activate the drive to rotate the rotor in response to a predetermined motion of the object or operator's body part in front of the contactless motion sensor.

2. The rotisserie oven according to claim 1, wherein the predetermined motion in front of the contactless motion sensor is a motion parallel to the contactless motion sensor.

3. The rotisserie oven according to claim 1 wherein the control system is configured to activate the drive to rotate the rotor in response to the predetermined motion in front of the contactless motion sensor over a predetermined amount of degrees.

4. The rotisserie oven according to claim 1, wherein the control system is configured to start a cooking program in response to a second predetermined motion in front of the contactless motion sensor.

5. The rotisserie oven according to claim 1, wherein the control system further comprises a display.

6. The rotisserie oven according to claim 5, wherein the control system is configured to bring the display in an active mode in response to a second predetermined motion in front of the contactless motion sensor.

7. The rotisserie oven according to claim 1, wherein the contactless motion sensor is selected from a group consisting of: infrared sensor, and electric field proximity sensor.

8. The rotisserie oven according to claim 1, wherein the contactless motion sensor is positioned at a predetermined height so that the contactless motion sensor detects movement of at least one of the operator's elbow, hand and head in front of the contactless motion sensor.

9. A method for contactless control of one or more functions of a rotisserie oven, comprising the steps:
a. detecting a motion of an object or an operator's body part in front of the rotisserie oven,
b. analyzing the detected motion,
c. selecting an action based on the analysis of the detected motion from a list with at least one action, wherein the list at least comprises controlling a drive of a rotor of the rotisserie oven to rotate, and
d. initiating the selected action, wherein the action is initiated by supplying power to the drive of the rotor of the rotisserie oven.

10. The method according to claim 9, wherein the step of controlling the drive of the rotor of the rotisserie oven to rotate, is controlling the drive of the rotor of the rotisserie oven to rotate over a predetermined number of degrees.

11. The method according to claim 9, wherein the list further comprises: starting a cooking program, and/or activating a display.

12. The method according to claim 9, wherein one or more of the steps of detecting a motion, analyzing a motion and selecting an action based on the analysis of the detected motion is/are not performed when the rotor of the rotisserie oven already is rotating.

13. The method according to claim 9, wherein the step of analyzing the detected motion comprises determining whether the analyzed motion is one selected from a group consisting of: a vertical motion, a horizontal motion parallel to the rotisserie oven, a motion towards the rotisserie oven, and a motion away from the rotisserie oven.

14. A nontransitory computer readable medium containing executable instructions to cause a control system for a rotisserie oven to implement operations including:
detecting a motion of an object or an operator's body part in front of the rotisserie oven,
analyzing the detected motion,
selecting an action based on the analysis of the detected motion from a list with at least one action, wherein the list at least comprises controlling a drive of a rotor of the rotisserie oven to rotate, and
initiating the selected action, wherein the action is initiated by supplying power to the drive of the rotor of the rotisserie oven.

* * * * *